United States Patent
Olds et al.

(10) Patent No.: US 7,747,907 B2
(45) Date of Patent: Jun. 29, 2010

(54) PREVENTIVE RECOVERY FROM ADJACENT TRACK INTERFERENCE

(75) Inventors: Edwin Scott Olds, Fort Collins, CO (US); Jonathan Williams Haines, Boulder, CO (US); Dan Joseph Coonen, Longmont, CO (US); Timothy Richard Feldman, Louisville, CO (US); Bruce Douglas Emo, Longmont, CO (US); James Joseph Touchton, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 537 days.

(21) Appl. No.: 11/230,718

(22) Filed: Sep. 20, 2005

(65) Prior Publication Data

US 2007/0074083 A1    Mar. 29, 2007

(51) Int. Cl.
*G06F 11/00* (2006.01)
(52) U.S. Cl. .......................................... 714/54; 714/42
(58) Field of Classification Search .................. 714/54, 714/5, 47, 42, 7; 360/60, 31; 711/112; 718/100
See application file for complete search history.

(56) References Cited

U.S. PATENT DOCUMENTS

| | | | |
|---|---|---|---|
| 4,751,702 A | 6/1988 | Beier et al. | |
| 4,956,803 A * | 9/1990 | Tayler et al. | 711/113 |
| 5,495,572 A * | 2/1996 | Tanaka et al. | 714/47 |
| 5,600,500 A | 2/1997 | Madsen et al. | |
| 5,721,816 A * | 2/1998 | Kusbel et al. | 714/15 |
| 5,761,411 A * | 6/1998 | Teague et al. | 714/47 |
| 5,828,583 A * | 10/1998 | Bush et al. | 702/185 |
| 6,043,946 A | 3/2000 | Genheimer et al. | |
| 6,061,197 A | 5/2000 | Wiselogel | |
| 6,084,729 A | 7/2000 | Ito | |
| 6,092,087 A | 7/2000 | Mastors | |
| 6,185,063 B1 * | 2/2001 | Cameron | 360/78.04 |
| 6,243,221 B1 | 6/2001 | Ito | |
| 6,310,741 B1 * | 10/2001 | Nishida et al. | 360/53 |
| 6,401,214 B1 | 6/2002 | Li | |
| 6,404,570 B1 * | 6/2002 | McNeil et al. | 360/31 |
| 6,415,189 B1 | 7/2002 | Hajji | |
| 6,460,151 B1 | 10/2002 | Warwick et al. | |
| 6,467,054 B1 * | 10/2002 | Lenny | 714/42 |
| 6,603,617 B1 | 8/2003 | Cross | |
| 6,606,210 B1 | 8/2003 | Coker et al. | |
| 6,611,393 B1 | 8/2003 | Nguyen et al. | |
| 6,657,805 B2 | 12/2003 | Nishida et al. | |
| 6,715,030 B1 | 3/2004 | Vandenbergh et al. | |

(Continued)

*Primary Examiner*—Scott T Baderman
*Assistant Examiner*—Kamini Patel
(74) *Attorney, Agent, or Firm*—Fellers, Snider, et al.

(57) ABSTRACT

A predictive failure control circuit and associated method are provided in a data storing and retrieving apparatus. The circuit is configured to schedule a data integrity operation on data associated with a subportion of a data storage space, in relation to a comparison of an accumulated plurality of executed host access commands associated with the subportion. The subportion can comprise a sector or a single track or a band of tracks. A table preferably stores accumulated number of host access commands for each of a plurality of subportions of the data storage space. The data integrity operation can comprise reading the data on to detect degradation and restoring the recovered data to the same or to new, different tracks. The data subportions can also be reallocated to a new location.

20 Claims, 8 Drawing Sheets

U.S. PATENT DOCUMENTS

| | | |
|---|---|---|
| 6,738,757 B1 | 5/2004 | Wynne et al. |
| 6,760,174 B2 | 7/2004 | Forehand |
| 6,766,465 B2 * | 7/2004 | Harada .......................... 714/2 |
| 6,771,440 B2 | 8/2004 | Smith |
| 6,781,780 B1 * | 8/2004 | Codilian ...................... 360/60 |
| 6,789,163 B2 * | 9/2004 | Fox et al. .................... 711/112 |
| 6,832,236 B1 * | 12/2004 | Hamilton et al. ............ 718/100 |
| 6,898,033 B2 | 5/2005 | Weinstein et al. |
| 7,111,129 B2 * | 9/2006 | Percival ...................... 711/141 |
| 7,127,560 B2 * | 10/2006 | Cohen et al. ................ 711/141 |
| 2002/0053046 A1 * | 5/2002 | Gray et al. .................... 714/42 |
| 2002/0184570 A1 * | 12/2002 | Etgen .......................... 714/42 |
| 2003/0182136 A1 | 9/2003 | Horton |
| 2004/0051988 A1 | 3/2004 | Jing et al. |
| 2004/0103246 A1 | 5/2004 | Chatterjee et al. |
| 2006/0010343 A1 * | 1/2006 | Tanaka et al. .................. 714/7 |
| 2006/0200726 A1 * | 9/2006 | Gittins et al. ............... 714/763 |
| 2007/0198803 A1 * | 8/2007 | Haines et al. ............... 711/173 |
| 2007/0283217 A1 * | 12/2007 | Gorfajn et al. ............. 714/758 |
| 2008/0147968 A1 * | 6/2008 | Lee et al. .................... 711/103 |

* cited by examiner

| TRACK | # STORES |
|---|---|
| LOC (13,321) | 3,201 |
| LOC (101,717) | 1,716 |
| LOC (7,278) | 1,595 |
| LOC (7,279) | 717 |
| LOC (37,208) | 481 |
| LOC (116,007) | 413 |
| ⋮ | ⋮ |
| LOC (87,118) | 72 |

| BAND | # STORES |
|---|---|
| 7 | 2,110 |
| 5 | 1,978 |
| 2 | 1,502 |
| 1 | 1,300 |
| 9 | 674 |
| ⋮ | ⋮ |
| 3 | 317 |

PREVENTIVE RECOVERY FROM ADJACENT TRACK INTERFERENCE

FIELD OF THE INVENTION

This invention relates generally to the field of data storage and more particularly, but not by way of limitation, to preventive data recovery during data storage.

BACKGROUND

Data storage device product and process technology has evolved to the extent that many hundred-thousand data storage tracks per inch can be reliably used to provide a very high density storage space package. The end of this evolution is not yet in sight. However, as areal storage density continues to increase, and as data storage behaviors tend toward repeated storage of data in localized regions, new concerns are arising associated with adjacent track interference.

Some data storage devices use a write element to store data in the form of magnetic transitions in the storage medium. Ensuring the thermal stability of these magnetic transitions has in the past been successfully accomplished by constructing the storage medium for a substantially uniform distribution of stored data throughout the storage space. However, more recent data storage applications, such as point-of-sale applications, can result in accelerating the thermal decay, in that repeated writing to a given track subjects adjacent tracks to magnetic flux fringe effects that can no longer be ignored as negligible. Repeated writes to the same track, along with ever-higher track density, have fundamentally changed the assumption that "writes are free." What is needed is an apparatus and associated methodology for preventive recovery of data corrupted by adjacent track interference. It is to these and other improvements that embodiments of the present invention are directed.

SUMMARY OF THE INVENTION

In accordance with preferred embodiments, an apparatus and associated method are provided for preventing the corruption of stored data by adjacent track interference, such as produced by fringing effects of a data storage head.

In some embodiments a predictive failure control circuit is provided that is configured to schedule a data integrity operation on data associated with a subportion of a data storage space in relation to an accumulated plurality of executed host access commands associated with the subportion.

In some embodiments a method is provided comprising defining a subportion of a data storage space, and scheduling a data integrity operation on data associated with the subportion in relation to an accumulated plurality of executed host access commands associated with the subportion.

In some embodiments an apparatus is provided comprising a data transfer member responsive to host commands in a data storing and retrieving relationship with a storage medium, and means for preventing adjacent track interference on the storage medium in relation to an accumulated plurality of executed host access commands associated with a selected subportion of the medium.

These and various other features and advantages that characterize the claimed invention will be apparent upon reading the following detailed description and upon review of the associated drawings.

DETAILED DESCRIPTION

Figure 1:
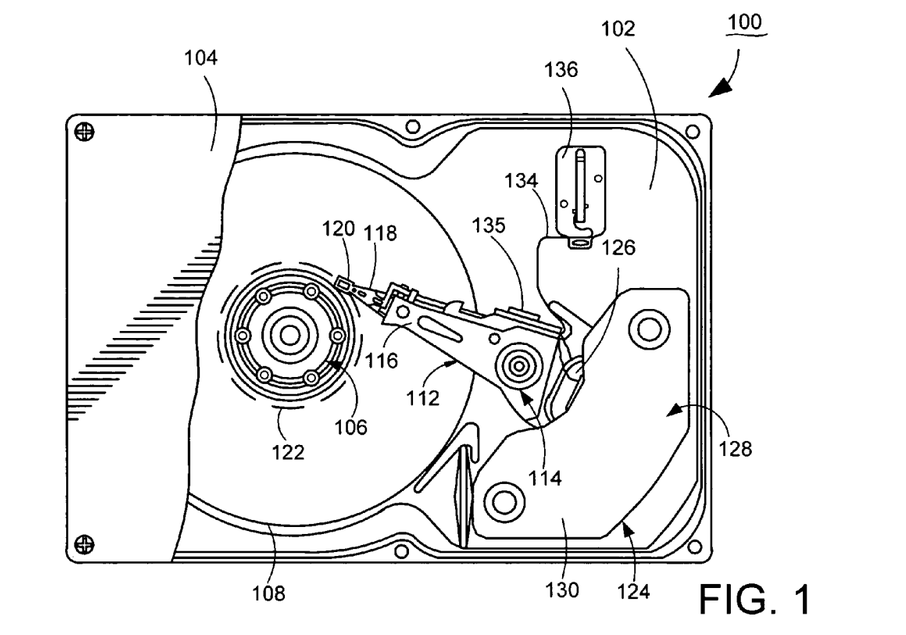
FIG. 1 is a plan view of a data storage device constructed and operated in accordance with embodiments of the present invention.

Referring to the drawings in general, and more particularly to FIG. 1, shown therein is a plan view of an illustrative data storage device 100 that is constructed in accordance with embodiments of the present invention. The device 100 preferably includes a base 102 and a cover 104 (partially cutaway), which together provide a housing for a number of components. The components include a motor 106 to which one or more data storage mediums 108 are mounted for rotation therewith. Adjacent the medium 108 is an actuator assembly 112 that pivots around a bearing assembly 114. The actuator assembly 112 includes an actuator arm 116 supporting a load arm 118 that, in turn, supports a head 120 in a data transfer relationship with the adjacent medium 108. Each medium 108 can be divided into data tracks, such as track 122, and the head 120 is positioned adjacent the data tracks 122 to retrieve data from and store data to a respective track 122.

The tracks 122 can be provided with head position control information written to embedded servo sectors. Between the embedded servo sectors are data sectors used for storing data in the form of bit patterns. The head 120 can include a read element and a write element (shown below). The write element stores input data to the track 122 during write operations of the device 100, and the read element retrieves output data from the tracks 122. The output data can be previously stored data that is being recalled for use in processing, or the output data can be servo data used to control the positioning of the head 120 relative to a desired track 122. In alternative equivalent embodiments a medium 108 can be dedicated to providing servo information for one or more other heads 120.

The terms "servoing" and "position-controlling," as used herein, mean maintaining control of the head 120 relative to the medium 108 during operation of the device 100. The actuator assembly 112 is positionally controlled by a voice coil motor (VCM) 124, that includes an actuator coil 126 immersed in a magnetic field generated by a magnet assembly 128. A pair of steel plates 130 (pole pieces) mounted above and below the actuator coil 126 provides a magnetically permeable flux path for a magnetic circuit of the VCM 124. During operation of the device 100 current is passed through the actuator coil 126 forming an electromagnetic field, which interacts with the magnetic circuit of the VCM 124, causing the actuator coil 126 to move. As the actuator coil 126 moves, the actuator assembly 112 pivots around the pivot shaft bearing assembly 114 causing the head 120 to be moved radially across the medium 108.

To provide the requisite electrical conduction paths between the head 120 and device 100 control circuitry, head wires can be routed on the actuator assembly 112 from the head 120, along the load arm assembly 118 and the actuator arm 116, and to a flex circuit 134. The head wires are secured to corresponding pads of a printed circuit board (PCB) 135 of the flex circuit 134. The flex circuit 134 is connected to a flex circuit bracket 136, which in turn is connected through the base 102 to a device 100 PCB (not shown) which can be mounted externally to the enclosure.

Figure 2:
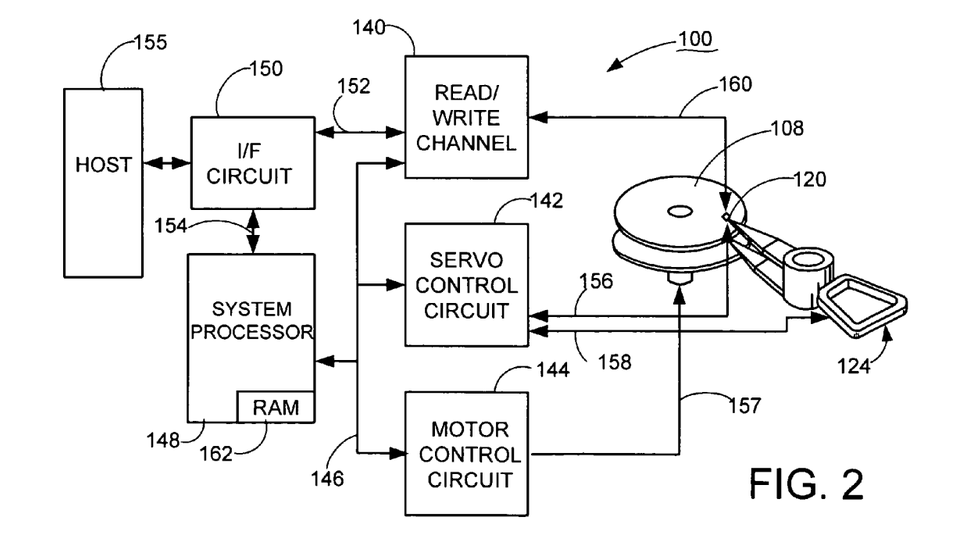
FIG. 2 is a functional diagram of the data storage device of FIG. 1.

FIG. 2 is a functional block diagram of the device 100 generally comprising a read/write channel 140, a servo control circuit 142, and a motor control circuit 144, all connected by a control bus 146 to a controlling system processor 148. An interface circuit 150 is connected to the read/write channel 140 by bus 152 and to the system processor 148 by bus 154. The interface circuit 150 serves as a communications interface between the device 100 and a host (or other network server) 155.

The motor control circuit 144 controls the rotational speed of the motor 106, and thus the medium 108, by signal path 157. The servo control circuit 142 receives servo position information from the head 120 by way of signal path 156 and, in response thereto, provides a correction signal by way of signal path 158 to an actuator coil portion of the VCM 124 in order to position the head 120 with respect to the medium 108. As the coil 126 moves, a back electromagnetic force (BEMF) can be communicated by way of signal path 158 that is proportional to the velocity with which the coil 126 is moving. The read/write channel 140 passes data to be stored to and retrieved from the medium 108, respectively, by way of signal path 160 and the head 120.

Generally, in response to an access command from the host 155 and received by the system processor 148 from the interface 150, the processor 148 controls the flow of data to and from the medium 108. The read/write channel 140, in turn, provides store and retrieve signals to the head 120 in order to store data to the medium 108 and retrieve data from the medium 108. The head 120 can, for example, provide an analog read signal to the read/write channel 140, which in turn converts the analog read signal to digital form and performs the necessary decoding operations to provide data to the interface circuit 150 for output to the host 155. In controlling these operations of the device 100, the system processor 148 employs the use of programming instructions stored in memory 162.

Figure 3:
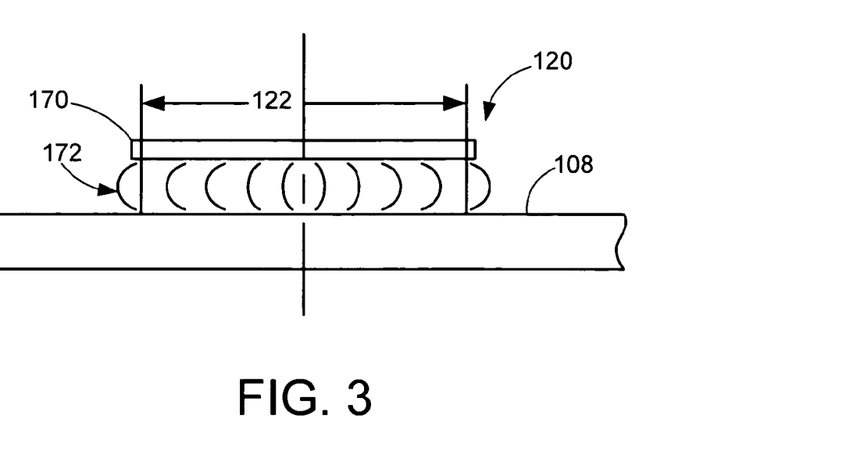
FIG. 3 is an elevational view of the write element in a data storing relationship with the medium.
Figure 4:
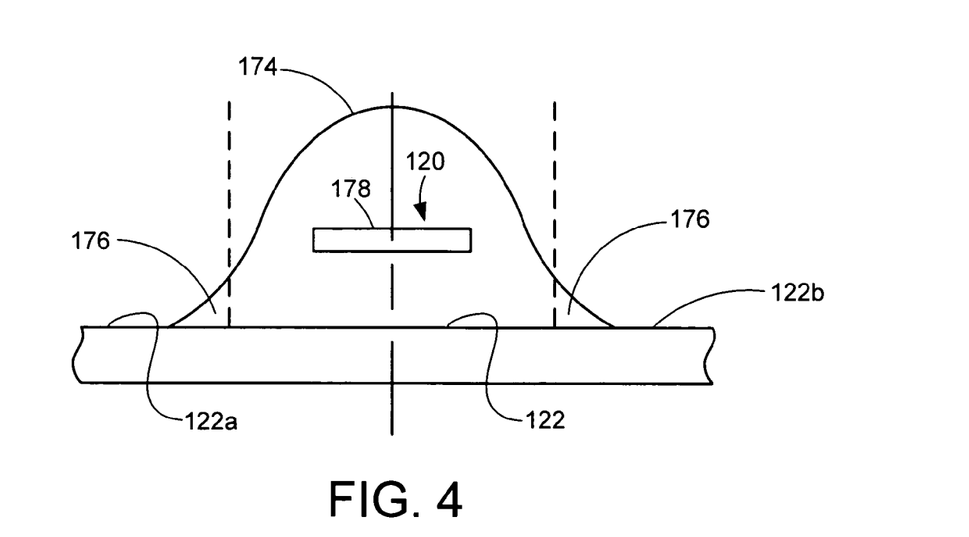
FIG. 4 is a diagrammatic representation of the flux density of a stored data as viewed by the read element.

FIG. 3 is a diagrammatic illustration of a write element portion 170 of the head 120 in a data storing relationship with the medium 108. The head is positioned relative to a track 122 centerline, and there selectively energized in order to emanate a magnetic flux field 172 that stores input data, such as by imparting magnetic transitions in the medium 108. Typically, the fringe effects of the flux field 172 are wider than the track 122 width, as illustrated by a flux density profile 174 illustrated in FIG. 4. That is, it has been observed that under certain conditions an advantageously robust flux field 172 can be imparted to a particular track 122 location with negligible affects of tail portions 176 of the flux density profile 174 that are imparted to adjacent tracks 122a and 122b. The fringe effects have been successfully treated in the past as being negligible; this is due in part because of the flux strength with which data in the adjacent tracks 122a, 122b are stored, in part because of the relatively minimal extent to which the tail portions 176 encroach upon the adjacent tracks 122a, 122b, and in part because a read element portion 178 of the head 120 is typically narrower than the write element portion 170. Because of the latter, with sufficient tracking precision of the head 120 the read element portion 178 is capable of reading a centrally disposed portion of the entirety of the stored data.

However, it has also been observed that there are compounding circumstances whereby these flux fringe effects can no longer be ignored as negligible. One aspect of these circumstances is related to the continual momentum in the industry to ever-higher areal storage density, resulting in higher track density and thus requiring narrower track 122 width. Another adverse aspect is related to cumulative effects of repeated writings to the same portion of the medium, such as to a particular sector, or to a particular track or a band of tracks. These kinds of repeated writings are typical of activities commonly associated with the continual updating of stored information, such as but not limited to storage devices used in point-of-sale data transactions. Clearly, these adverse aspects are exacerbated to the extent that off-track budgeting permits the storing and retrieving of data with the head 120 being disposed in a somewhat nonaligned relationship with the track 122 centerline.

The ability of the storage medium to reliably "hold" a stored direction of magnetization is related to a material property of the grains of magnetic material known as anisotropy energy. As areal density has increased, the grain size has correspondingly decreased in order to maintain the requisite number of grains for adequate thermal stability. However, the anisotropy energy of each grain is proportional to its size, so the relatively smaller grains are more susceptible to thermal decay (superparamagnetic effect). It has been observed that the flux fringe effects from a large number of repeated writes to a particular track produces adverse cumulative effects on the adjacent tracks. This adjacent track interference acts to accelerate the thermal decay rate by weakening the energy barrier between oppositely charged magnetized regions, and thereby significantly increasing the likelihood of data corruption.

The present embodiments contemplate an apparatus and associated methodology for predictively scanning stored data that might have been corrupted by adjacent track interference associated with storing data to other tracks. More particularly, a predictive failure control circuit is provided in a data storing and retrieving apparatus that performs a data integrity operation on data stored in a subportion of a data storage space in relation to an observed number of host 155 accesses associated with the subportion. Referring to FIG. 2, the predictive failure control circuit can include written instructions executed by the system processor 148 and storing information in memory 162. Alternatively, although not shown in FIG. 2, the predictive failure control circuit can include an intelligent storage processor either standing alone or incorporated within the system processor 148.

The subportion of data storage space can be defined as individual storage tracks 122. In alternative equivalent embodiments, as discussed further below, the subportion can be defined as sectors, tracks, or bands of tracks. In the former embodiments, the instances of host 155 commands storing data to a particular track 122 can be observed and stored in memory. When the accumulated number of such host 155 commands satisfies a predetermined threshold, then the data stored on adjacent tracks can be scanned to ensure it remains retrievable. If the data stored on the adjacent tracks indicates a certain diminished integrity then it can be stored again before it likely becomes irretrievable.

Figure 5:
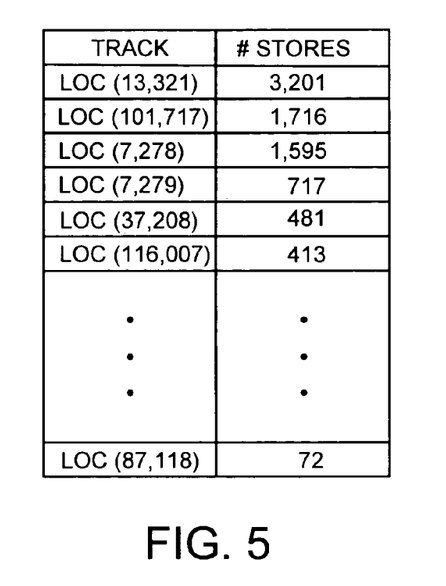
FIG. 5 is a count table stored in memory for accumulating repeated host access commands to locations of the data storage space.

FIG. 5 illustrates a count table stored in memory that accumulates the number of host 155 commands associated with storing data (# STORES) for each of a plurality of tracks 122. The tracks 122 are denominated according to a sequential track number, and are sorted from most-frequently accessed track to least-frequently accessed track. For instance, "LOC (13,321)" corresponds to track number 13,321 which has been accessed most often with 3,201 instances of storing data to the track during the applicable period. The number of track location entries is generally limited to the amount of memory that can be allocated to the count table.

Figure 6:
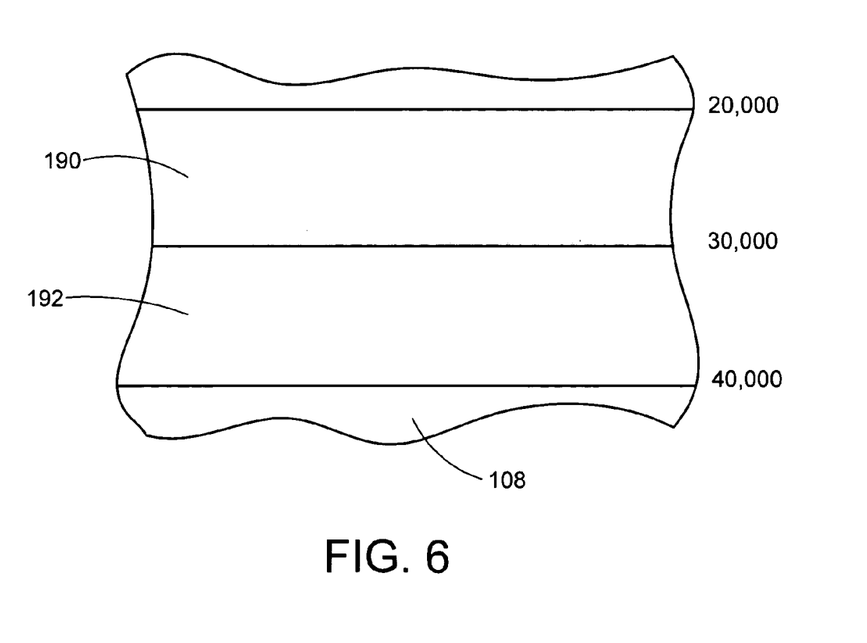
FIG. 6 is a diagrammatic view of bands of data storage tracks defining the subportions.

To make a more efficient use of the allocated memory, the subportion can be defined in terms of a plurality of tracks, and preferably in terms of a plurality of adjacent tracks defining a band of tracks. FIG. 6, for example, is a diagrammatic illustration of a portion of the storage space with track numbers 20,000; 30,000; and 40,000 indicated. A band 190 from track 20,001 to track 30,000 can define a first subportion, and a band 192 from track 30,001 to track 40,000 can define an equivalent size second subportion. In other embodiments the subportions can be defined by different numbers of tracks 122, such as where it is expected or observed that relatively more tracks in close proximity are accessed, justifying more granularity in the analysis in that region of the data storage space.

Figure 7:
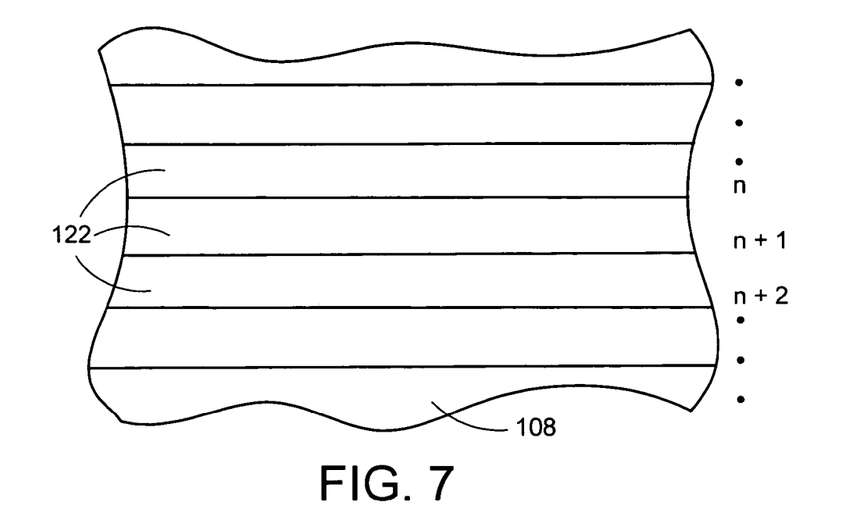
FIG. 7 is a diagrammatic view of abutting data storage tracks within the bands of FIG. 6.

FIG. 7 is an enlarged diagrammatical representation of adjacent tracks 122 within one of the subportions. If the number of host 155 accesses associated with storing data to track$_{n+1}$ satisfies a predetermined threshold, then the adjacent track$_{n+2}$ and the other adjacent track$_n$ can be scanned for evidence of corrupted data resulting from adjacent track interference. Preferably, during the scanning operation error correction code methodologies are scaled back in order to provide an early detection of adjacent track interference. If, at the reduced error correction effectiveness scheme a substantial signal degradation is discovered, then the error correction scheme can then be returned to normal effectiveness in order to recover and then re-store the data while it is still retrievable. Degradation of the output signal can be determined by comparing the retrieved output signal with an expected value, such as but not limited to in terms of an observed bit error rate. The recovered data can be rewritten to the adjacent track or tracks (track n and/or n+2, respectively), or the recovered data can be reallocated to a new location on the medium 108, as desired.

Figure 8:
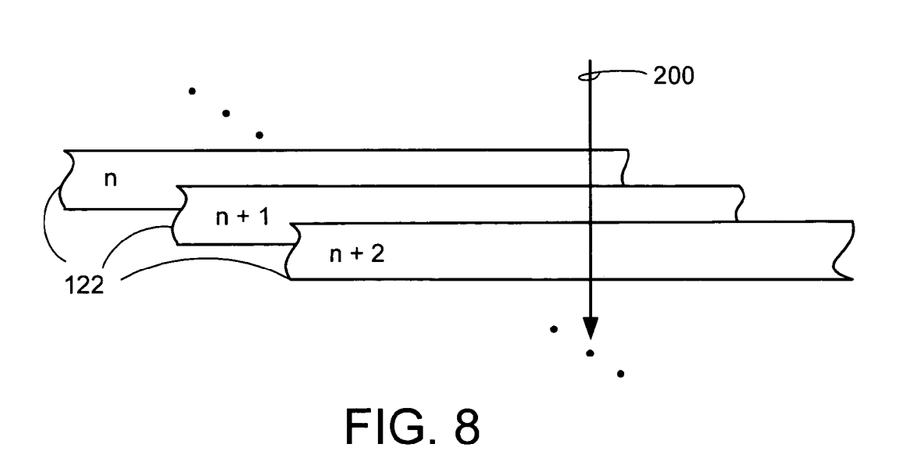
FIG. 8 is a diagrammatic view of overlapping data storage tracks within the bands of FIG. 6.
Figure 9:
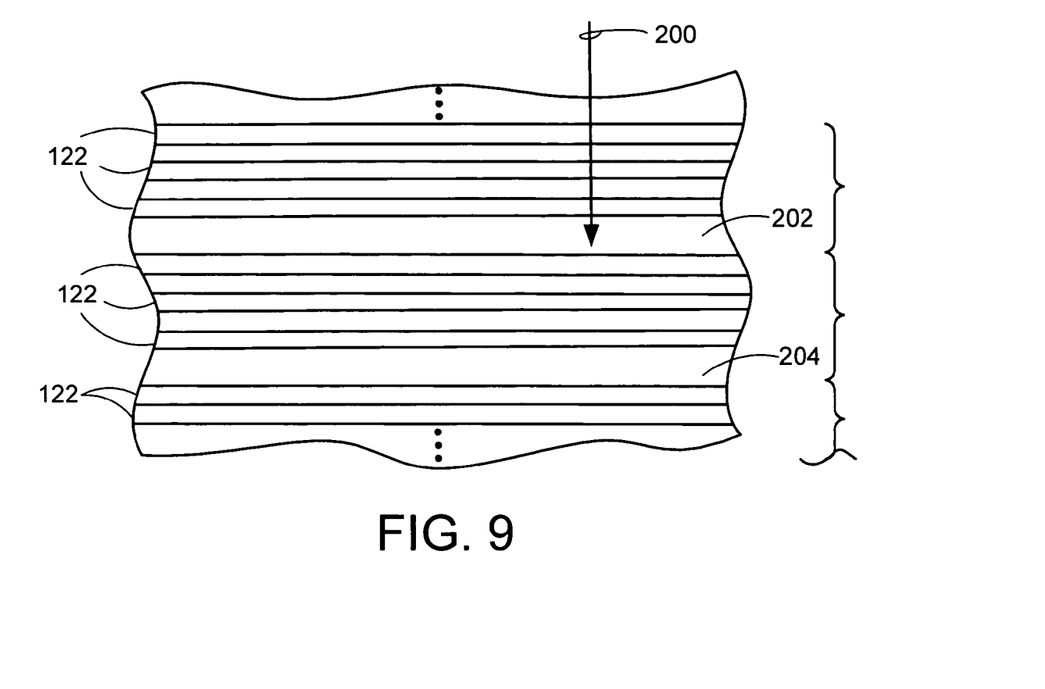
FIG. 9 is a diagrammatic view of bands of data storage tracks with guard bands between adjacent bands.

FIG. 8 is a diagrammatic illustration of present embodiments used in conjunction with a scheme of overlapping the tracks 122 to increase the track density. Because the write element 170 (FIG. 3) is relatively wider than the read element 178 (FIG. 4), data stored on successive tracks can partially overlap a previous track, leaving in effect a smaller previous track that can still be read with the reader element 178. In such an arrangement, however, the storing of data to a particular track 122, such as track$_{n+1}$, will also overwrite a portion of the track that overlaps it. Accordingly, the storing of data to a particular track 122 requires re-storing all the data on overlapping tracks in the overlapping direction, such as is illustrated by the reference arrow 200 for the embodiments of FIG. 8. For this reason it can be advantageous as illustrated in FIG. 9 to place guard bands 202, 204 of unused storage space between adjacent subportions 206, 208, 210 defined by bands of overlapping data tracks 122. The guard bands 202, 204 provide clearance for the writer element 170 to store data to the outer track 122 within a subportion, in direction 200, without overwriting another track 122.

Figure 10:
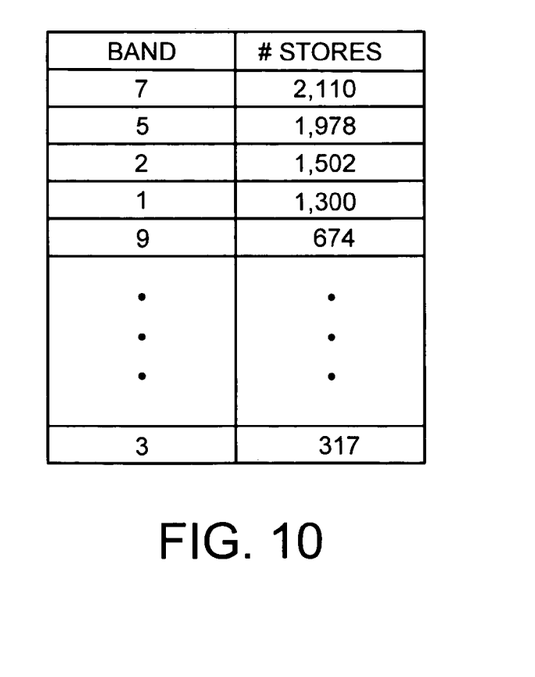
FIG. 10 is a count table stored in memory for accumulating instances of host store commands to bands of the data storage space.

FIG. 10 illustrates a count table stored in memory that is similar to that discussed in relation to FIG. 5, but wherein the # STORES accumulates instances of host 155 store commands to any of the tracks within the bands 206, 208, 210 of pluralities of tracks 122 defining the subportions. For example, the most accesses have been observed in band 7, and the least number of accesses in band 3. The bands can consist of abutting or overlapping tracks 122, as discussed above.

In one aspect the apparatus of the present embodiments performs the data integrity operations in a particular band independently of the other bands. For example, if the number of host 155 accesses to a particular band satisfies a predetermined threshold, then all the data stored in that band will be scanned for integrity sake. Alternatively, if the number of host 155 accesses in a band is observed to be particularly high or nonuniformly distributed, then the count table can be modified or a new table can be constructed in memory to track sub-band activity. That is, subgroups of tracks or even individual sectors or tracks within a band can be monitored in order to enhance the granularity of data collection and thus reduce the number of tracks 122 that are scanned during the data integrity operation. In some embodiments the band counts can be incremented by a weighted count based on where within the band the host 155 accesses occur. That is, a host 155 access to a track at or near an outer edge of a band is more likely to create adjacent track interference in a track of an adjacent band than a host 155 access to a centrally-disposed track in the band. For purposes of this description and meaning of the appended claims, "weighted incremental data" accumulated by the count table is associated with assigning a count table value in relation to a location of a host access within a plurality of data storage tracks. Thus, a band count for a track disposed on or near an outer edge of one band can also increment a count, preferably a weighted partial count, for the adjacent band. In this manner, the data integrity operations can be characterized as scanning data from two adjacent bands in response to satisfying a threshold number of host 155 accesses to only one of the two bands.

As discussed further below, preferably the predetermined threshold levels are designed to incrementally scrutinize the count table information. That is, device 100 operating efficiency can be enhanced if the data integrity operations can be performed offline, or during operation intervals when there are no pending host 155 access commands to execute. Thus, the threshold can include a recommended value, which when satisfied will instruct the device 100 to schedule the data integrity operations off-line. However, if a count table value satisfies a higher mandatory value without having fully executed the data integrity operation, then the data storage device will be instructed to immediately perform the data integrity operations, ceasing other device 100 access activities until the data integrity operations are completed.

Figure 11:
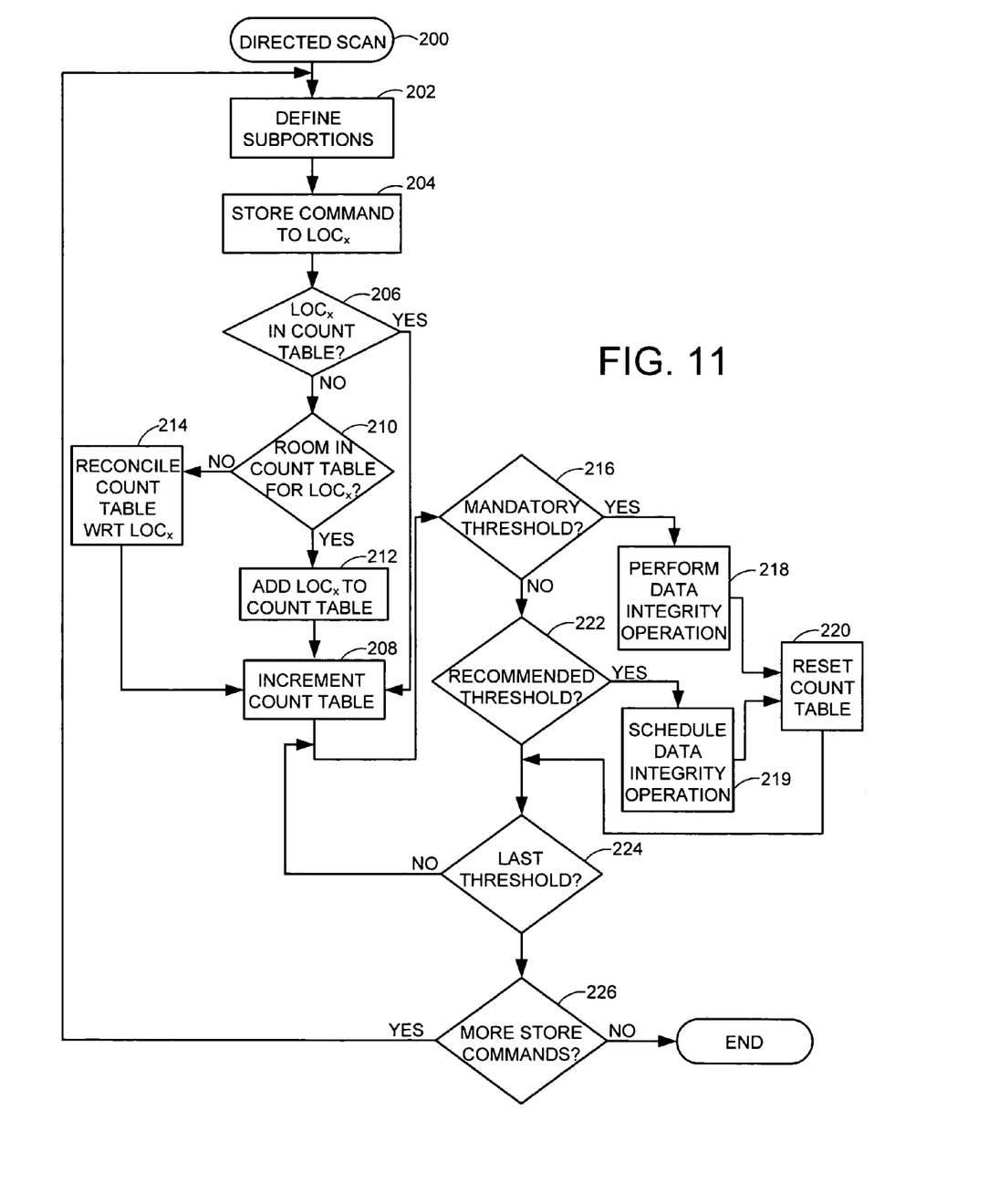
FIG. 11 is a flowchart illustrating steps for practicing a preventive recovery method in accordance with embodiments of the present invention.

FIG. 11 illustrates steps carried out for performing a preventive recovery method 200 in accordance with embodiments of the present invention. The method 200 begins with defining or obtaining a previously defined arrangement of the subportions of the data storage space in block 202. That is, the subportions can be defined as individual sectors or as individual tracks 122 or bands of a plurality of tracks 122. The subportions can be statically predefined, or an intelligent storage processor can be utilized to empirically define the subportions according to the observed host 155 accesses. In the latter case the intelligent storage processor can initially define a plurality of equally sized bands, and then adjust the arrangement of the bands based on the actual observations of host 155 accesses. Once the subportions are defined then the rest of the steps in method 200 illustrate a simple write count algorithm (SWCA) for performing a data integrity operation on data stored in a subportion in relation to observing a number of host 155 accesses corresponding to the subportion.

In block 204 a host 155 store command is observed to "location x" ($LOC_x$) of the storage space. In block 206 it is determined whether $LOC_x$ is already represented in the count table, such as discussed above with reference to FIG. 5 and/or FIG. 10. If the determination of block 206 is yes, then $LOC_x$ is incremented in the count table in block 208. If the determination of block 206 is no, then in block 210 it is determined whether there is room for another entry in the count table for $LOC_x$. If yes, then $LOC_x$ is added to the count table in block 212 and incremented in block 208.

If the determination of block 210 is no, then the count table is reconciled with respect to $LOC_x$ in block 214. By "reconciled" it is meant that the count table must be effectively utilized to manage more storage location entries that what was allocated in memory to do so. In the simplest sense this can mean dropping one location in the count table in favor for another location. It can be important for the $LOC_x$ entry to be included in the count table, else it could repeatedly be discarded in favor of the existing listing of entries without having a chance to accumulate to a significant level of observed accesses. For this reason, the new $LOC_x$ can be added to a full count table at the expense of dropping the least relevant existing entry, such as the oldest observed location entry, or the lowest count location entry, or a combination of both the lowest and oldest or oldest and lowest count entry. In any event, in some embodiments the existing count of an entry at the time it is dropped from the count table can be stored in memory and recalled for use if that location is again posed for reconciliation with the count table. After reconciliation, control passes to block 208 where the count table is incremented.

After incrementing the count table in block 208, the method 200 then compares the counts in the count table with one or more predetermined threshold values for directing a data integrity operation, such as a scan of data associated with the count table entry satisfying the threshold. For purposes of this description, "data associated" with the count table entry can be adjacent tracks to a track satisfying the threshold count, or one or more tracks within a band of tracks for a band satisfying the threshold. The illustrative embodiments of FIG. 11 utilize a two-tier threshold scheme, but in alternative equivalent embodiments a single threshold or more than two thresholds can be utilized. In some embodiments an intelligent storage processor can be used to empirically adjust the threshold level or levels based on the actual level of corrupted data compared to the prediction thereof.

In block 216 it is determined whether a count from the count table satisfies a mandatory threshold value. If yes, then the data integrity operation (such as scanning data associated with the threshold value count) is immediately performed in block 218. This can mean that other data access activities of the device 100 are otherwise suspended until the data integrity operation is completed. When the data integrity operation is completed, the count (or counts) for the location(s) affected by the data integrity operation is reset in block 220.

If the determination of block 216 is no, then in block 222 it is determined whether a lower recommended threshold is satisfied by the count (or counts) from the count table. If yes, then the data integrity operation is scheduled for performance during a time that the data storage device is otherwise offline with respect to data access operations. After the scheduled data integrity operations are completed, the count (or counts) for the location(s) affected by the scheduled data integrity operation is reset in block 220.

Control then passes to block 224 where it is determined whether all counts satisfying the thresholds have been addressed; if no, then control returns to block 216. If the determination of block 224 is yes, then in block 226 it is determined whether there are any more host 155 store commands not addressed by the method 200. If yes, then control returns to block 202; otherwise, the method ends.

Figure 12:
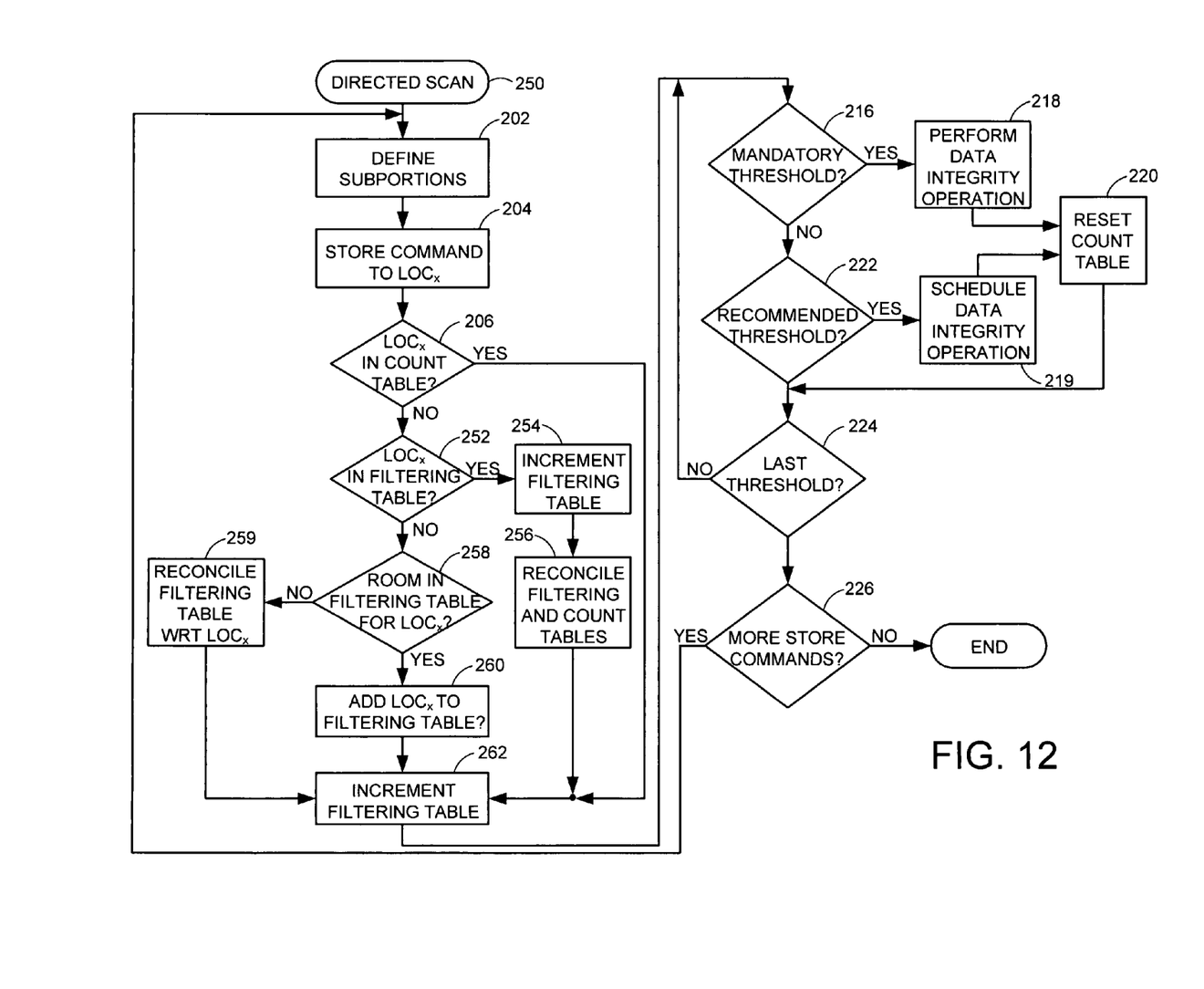
FIG. 12 is a flowchart illustrating steps for practicing a preventive recovery method in accordance with embodiments of the present invention.

FIG. 12 illustrates embodiments of the present invention similar to FIG. 11 but more particularly describing an illustrative method 250 of managing more storage location entries than what the count table can hold. In essence, the method 250 is a modified SWCA. Generally, the embodiments of FIG. 12 include a filtering table holding storage location counts in memory that are not included in the count table. For clarity sake, steps in the method 250 that are substantially similar to those discussed above for method 200 retain the same reference numerals.

The embodiments of method 250 begin by defining or obtaining a previously defined arrangement of the subportions in block 202. A host 155 store command to $LOC_x$ is observed in block 204, and then in block 206 it is determined whether $LOC_x$ is presently in the count table. If so, then the method 250 proceeds in the sequence of mandatory and recommended threshold checks and the associated performing or scheduling the data integrity operations as in the method 200.

If the determination of block 206 is no, then in block 252 it is determined whether $LOC_x$ is presently contained within a filtering table, which is another data table stored in memory. The filtering table is essentially a holding place for accessed locations that are not relevant enough to populate a full count table. If the determination of block 252 is yes, then the entry is incremented in block 254. In block 256 the filtering table is then reconciled with the count table, according to predetermined rules. For example, without limitation, if an entry in the filtering table has a count exceeding a count in the count table, then the entries may be swapped between the tables. In another example, if a filtering table entry and a count table entry have the same or substantially the same counts, then the latest incremented count may be selected for placement in the count table and the other in the filtering table. After this reconciliation, the method 250 proceeds with the mandatory and recommended threshold checks and the associated performing or scheduling the data integrity operations as in the method 200.

If the determination of block 252 is no, then in block 258 it is determined whether there is room for $LOC_x$ in the filtering table. If yes, then $LOC_x$ is added as an entry in the filtering table in block 260, the filtering table is incremented in block 262, and control passes in the method 250 for further processing in a similar way as in method 200. If, however, the determination of block 258 is no, then the filtering table is reconciled with respect to $LOC_x$ in block 259, in a manner similar to the reconciliation in block 214 of method 200. That is, $LOC_x$ can be advantageously introduced to the filtering table by replacing the least relevant existing entry, such as the lowest count and/or the oldest entry in the filtering table.

Figure 13:
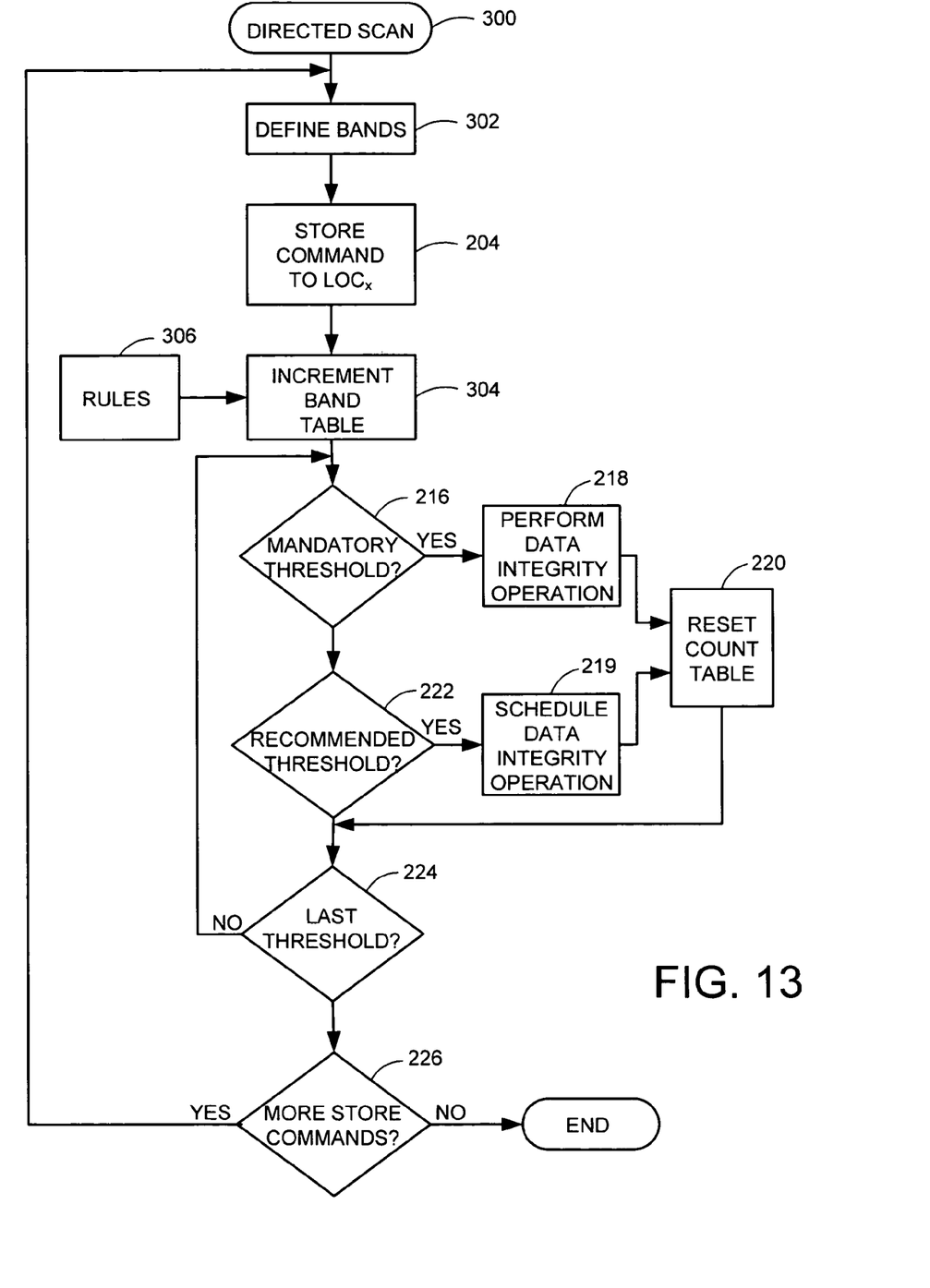
FIG. 13 is a flowchart illustrating steps for practicing a preventive recovery method in accordance with other embodiments of the present invention.

FIG. 13 is a flowchart of a preventive recovery method 300 specifically implementing a band count algorithm. Similar to block 202 in methods 200, 250, in block 302 the bands are defined either by or for the method 300. As described above, where an intelligent storage processor is used, the bands can be redefined on the basis of empirical observations of the locations of host 155 store commands. In block 204, as above, the method 300 observes a host 155 store command to $LOC_x$.

In block 304 the band associated with the $LOC_x$ is incremented according to band count rules 306. The band count method 300 is less likely to miss a relevant accumulation of counts because, unlike the methods 200, 250, it does not involve possible continuous replacements of entries in count tables. That is, all data storage tracks 122 can be covered by a significantly smaller band count table. However, the band count method 300 can be overinclusive by triggering data integrity operations for a large number of tracks 122 in response to high access rates associated with just one or just a few tracks 122 within the band. Accordingly, the band count rules 306 can be defined to give a weighted value to the band count accumulations. For example, without limitation, the practical possibility of adjacent track interference is greater when accessing an "interior-of-band" track (having two adjacent data storage tracks), as opposed to an "edge-of-band" track (having only one adjacent storage track and a guard band). Accordingly, the band count rules in block 306 can define a relatively greater weighted count value for incrementing an "interior-of-band" track in comparison to an "edge-of-band" track. If the bands are relatively narrow, or if there is a high density of storage accesses within adjacent bands, then the band count rules in block 306 may increment the band in which $LOC_x$ resides a relatively greater weighted count value and the adjacent band or bands a relatively lesser weighted count value.

The incremented band counts are then compared to mandatory and recommended thresholds 216, 222 that trigger performing or scheduling data integrity operations 218, 219, respectively. The data integrity operations 218, 219 can be performed on all the tracks within a band, or a statistical sampling of various tracks can be done to determine whether more data integrity operations appear to be warranted. Afterward, the band counts are reset and control passes either back to block 302 or the method 300 ends, as in the previous methods 200, 250.

The embodiments set forth above are useful in, but not limited to, a data storage device having a moveable data transfer head in a data storing and retrieving relationship with a magnetic storage medium. In alternative equivalent embodiments the data storage device can involve an optical storage methodology, or an alternative magnetic storage medium such as in a tape drive. In other alternative embodiments a solid state memory device, such as a random access memory, can utilize the present embodiments to prevent the corruption of stored data.

For purposes of this description and meaning of the appended claims, the term "means for preventing" adjacent track interference expressly requires an apparatus and methodology capable of functionally monitoring conditions in a data storage device while it is operating in perpetuity. That is, the function of the present embodiments described herein expressly contemplates accumulating a large number of host access commands before triggering a data integrity operation, then resetting the count, and starting over again throughout the operating life of the data storage device. Accordingly, the embodiments contemplated herein and within the claim scope of the "means for preventing" language expressly does not include teachings associated with writing to one storage location and merely observing the extent to which adjacent tracks may or may not have been encroached.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims. For example, without limitation, the embodiments described herein refer to data integrity operations. Generally, the data integrity operations are performed in order to prevent corruption of data by adjacent track interference. The data preventively recovered by the data integrity operations thus might be advantageously re-stored in its present location, or might be re-stored to a different location. Storing the data to a different location can be done to prevent recurrence of the problem where there is relatively high density of highly frequent host store commands taking place. Other preventive actions are also possible and contemplated herein, such as but not limited to reallocating the data to an outer track of a band of tracks, such that repeatedly storing data to the track involves only one rather than two adjacent tracks.

What is claimed is:

1. A predictive failure control circuit apparatus that executes instructions stored on a computer readable medium to store ongoing observed numbers of executed host access commands individually for each of a plurality of different addressable storage locations of the medium, to compare each of the stored observed numbers to a predefined threshold quantity of executed host access commands, and in response to the comparison indicating that the stored observed number of executed host access commands at a first addressable storage location is greater than the predetermined threshold then to perform a data integrity operation on data stored at a second differently addressable storage location of the medium at a time when the stored observed number of executed host access commands at the second addressable storage location is less than the predetermined threshold quantity of executed host access commands.

2. The apparatus of claim 1 comprising a count table stored in the memory configured to store the observed numbers of executed host access commands.

3. The apparatus of claim 2 comprising a filtering table stored in memory configured to store a queue of other observed numbers of executed host access commands for each of a plurality of other addressable storage locations that are not represented in the count table but that are candidates for populating the count table in relation to ongoing host access command activity.

4. The apparatus of claim 1, wherein the first and second addressable storage locations are defined as different data storage tracks.

5. The apparatus of claim 4 wherein the data storage tracks are adjacent.

6. The apparatus of claim 5 wherein the data storage tracks overlap.

7. The apparatus of claim 1 wherein the first and second addressable storage locations are contained in a plurality of adjacent data storage tracks.

8. The apparatus of claim 7 wherein the plurality of data storage tracks are overlapping.

9. The apparatus of claim 1 wherein the observed number of executed host access commands at the first addressable location reflects a value summing the number of executed host access commands to any of a plurality of data storage tracks in a predefined band of data storage tracks, and the number of executed host access commands at the second addressable location reflects a value summing the number of executed host access commands to any of another different plurality of data storage tracks in another predefined band of data storage tracks.

10. The apparatus of claim 9 wherein the observed number of executed host access commands at one of the addressable storage locations reflects weighted incremental data associated with respective track locations of the executed host access commands within the respective band of data storage tracks.

11. The apparatus of claim 1 wherein the executed host access commands are characterized by storing data to the medium.

12. The apparatus of claim 1 wherein the data integrity operation is characterized by non-host commands to scan the medium in order to retrieve data.

13. The apparatus of claim 12 wherein the data integrity operation is characterized by reducing an effectiveness of an error correction scheme while scanning the medium.

14. The apparatus of claim 12 further configured to compare the observed number of executed host access commands to the threshold to implement a first data integrity operation that is non-interruptive of the ongoing host access command activity and to compare the observed number of executed host access commands to a second threshold to implement a second data integrity operation that interrupts the ongoing host access command activity.

15. A method comprising:
defining a subportion of a data storage space having a first addressable location and a second differently addressable location;
storing in a memory an ongoing observed number of executed host access commands at the first addressable location;
storing in the memory an ongoing observed number of executed host access commands at the second addressable location individually discernible from the observed number stored at the first addressable location;
comparing the observed numbers of executed host access commands at the first and second addressable locations individually to a predetermined threshold quantity of executed host access commands; and
in response to the comparing step, performing a data integrity operation on data stored at the second addressable location when the observed number of executed host access commands at the first addressable location is greater than the predefined threshold quantity of executed host access commands but the observed number of executed host access commands at the second addressable location is less than the predefined threshold quantity of executed host access commands.

16. The method of claim 15 wherein the defining step is characterized by the first and second addressable locations being different data storage tracks.

17. The method of claim 15 wherein the performing step is characterized by retrieving data from the second addressable location of the data storage space in response to storing data to the first addressable location of the data storage space.

18. The method of claim 15 wherein the defining step is characterized by the first and second addressable locations each being a band of a plurality of data storage tracks.

19. The method of claim 15 wherein the performing step is characterized by a first data integrity operation that is non-interruptive of ongoing host access command activity when the observed number of executed host access commands exceeds the threshold and a second data integrity operation that interrupts the ongoing host access command activity when the observed number of executed host access commands exceeds a second threshold.

20. An apparatus comprising:
a data transfer member responsive to host commands in a data storing and retrieving relationship with a storage medium; and
means for preventing adjacent storage location interference on the storage medium in relation to executed host access command activity individually at each of a plurality of addressable storage locations of the medium and a predetermined threshold quantity of executed host access commands.

* * * * *